Jan. 23, 1951  M. DOBKOWSKI  2,539,234
FISHHOOK ATTACHMENT
Filed June 26, 1944
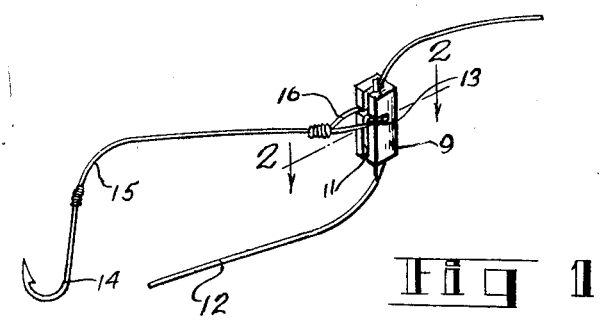
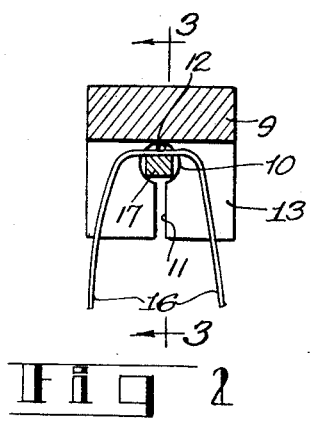
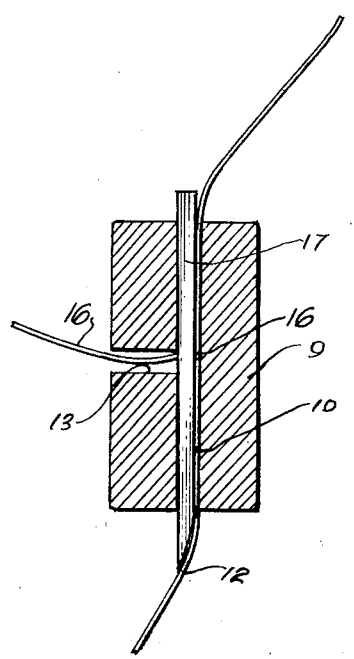
INVENTOR.
MATTHEW DOBKOWSKI

Patented Jan. 23, 1951

2,539,234

UNITED STATES PATENT OFFICE 2,539,234

FISHHOOK ATTACHMENT

Matthew Dobkowski, Detroit, Mich.

Application June 26, 1944, Serial No. 542,054

1 Claim. (Cl. 43—44.85)

My invention relates to a new and useful improvement in a fish hook attachment adapted to use on fish lines. On most fish lines, the hook is generally fastened to a flexible member which is termed a leader and this leader, in turn, is fastened to the fish line proper. It is an object of the present invention to provide means for attaching either the leader or the hook to the fish line in such a manner that when undue strain is exerted on the fish line through the hook, the fastening means may be broken permitting the hook to become detached from the line.

Another object of the present invention is the provision of an attachment of this class which will be simple in structure, economical of manufacture, durable, compact, light, buoyant and easily and quickly operated to remove and replace a hook or leader.

Another object of the invention is the provision of an attachment of this type having a retaining stem of breakable material slidably mounted in a passage formed in a buoyant, durable block.

Other objects will appear hereinafter.

It is recognized that various changes and modifications may be made in the detail of structure illustrated without departing from the invention and it is intended that such variations and modifications shall be encompassed within the scope of the claim which form a part hereof.

Forming a part of this application are drawings in which,

Fig. 1 is a perspective view of the invention;

Fig. 2 is an enlarged sectional view of the invention taken on line 2—2 of Fig. 1.

Fig. 3 is an enlarged sectional view of the invention taken on line 3—3 of Fig. 2.

As shown in the drawings, the invention comprises a block 9 of suitably buoyant material, such as plastic, wood or the like, which has a passage 10 formed therethrough. A longitudinally directed slot 11 is formed in the block 9 to communicate with the passage 10. This slot 11 is narrow and the fish line 12 may be forced through the slot under pressure so as to engage in the passage 10. The passage 10 is considerably larger than the line 12 so that the block 9 may freely slide on the line 12. A transverse slot 13 is formed in the block 9 inwardly to communicate with the passage 10. The fish hook 14 is illustrated as connected to a leader 15 having a loop 16 at its end.

In use, the block 9 would be mounted on the line 12 in the manner indicated and slid to the proper position on the line 12. The loop 16 would then be inserted in the slot 13 so as to overlie the passage 10. A peg 17, which is preferably tapered, is then forced into the passage 10 through the loop 16. By having this peg 17 tapered so that a press fit is encountered when it is forced into the passage 10, the leader or hook is attached to the line and the block 9 is made fixed relatively to the line. The peg 17, therefore, serves the dual function. This peg 17 may be made of wood or other suitable breakable material so that when an undue strain is exerted through the hook 14 to the loop 16, the peg 17 will break, permitting the leader and hook to become detached. In this way, should a fish of undue size be hooked or should the hook become snagged, the excessive strain transmitted to the line 12 will never become great enough to break the line 12, so that other fishing equipment which may be on the line 12 is thus saved permitting a loss only of the fish hook and its leader, if it has a leader. If it did not have a leader, the hook would be provided with an eyelet corresponding to the loop 16, as is commonly known.

By forming the block 9 from buoyant material, it will not have a tendency to sink the hook and, consequently, will maintain the hook at the proper elevation. The sinker at the end of the line will retain the hook at the proper depth.

The slot 11, in addition to serving as an inlet for the line 12 into the passage 10, also renders the block 9, to a certain extent, resilient as the slot will open wider as the peg 17 is driven into the passage 10. This compensates for what otherwise might be a defect in the structure. For instance, should the block 9 be formed of wood and the peg 17 formed of wood with the peg 17 driven into the passage 10 as a press fit, the block 9 might be ruptured because of the expansion resulting from the saturation of the block and peg. By providing the slot 11, an expansion of the peg in the passage 10 or closing of the passage 10 resulting through expansion because of the block having become wet, will be compensated for because of the springing effect which has been obtained by the presence of the slot 11.

What I claim as new is:

An attachment device of the class described, adapted for attaching a loop-bearing member to a fish line, comprising: a block of buoyant material having a longitudinal passage formed therethrough from end to end and provided with a longitudinal slot on one side and communicating with said passage throughout its length for passage of the line therethrough into said passage, and provided with a transverse slot extending inwardly from one face of said block to a point beyond said passage and of the full width of said block; a hook-bearing member having a loop on one end and inserted in said transverse slot with the loop overlying said passage; and a peg forced as a press fit into said passage through said loop and positioned on opposite sides of said transverse slot and maintaining said line and said block in clamped relation.

MATTHEW DOBKOWSKI.

REFERENCES CITED

The following references are of record in the file of this patent:

UNITED STATES PATENTS

| Number | Name | Date |
|---|---|---|
| 928,439 | Garrard | July 20, 1909 |
| 983,309 | Pfleuger | Feb. 7, 1911 |
| 1,259,664 | Peters | Mar. 19, 1918 |
| 1,296,370 | Darling | Mar. 4, 1919 |
| 2,069,972 | Schroeder | Feb. 9, 1937 |
| 2,152,275 | Parkins | Mar. 28, 1939 |
| 2,157,003 | Mussina | May 2, 1939 |
| 2,162,821 | Parmenter | June 20, 1939 |
| 2,315,048 | Croft | Mar. 30, 1943 |